United States Patent

Boix Jaen

[11] Patent Number: 5,441,381
[45] Date of Patent: Aug. 15, 1995

[54] BOX STACKER
[75] Inventor: Jose Boix Jaen, Elche, Spain
[73] Assignee: Boix Maquinaria, S.A., Elche, Spain
[21] Appl. No.: 321,152
[22] Filed: Oct. 7, 1994

Related U.S. Application Data

[63] Continuation of Ser. No. 982,692, Nov. 25, 1992, abandoned.

[30] Foreign Application Priority Data

Jul. 14, 1992 [ES] Spain ................................. 9201460

[51] Int. Cl.⁶ ............................................. B65G 57/30
[52] U.S. Cl. .............................. 414/790.3; 414/900; 414/795.3
[58] Field of Search ....................... 414/900, 907, 790.3

[56] References Cited

U.S. PATENT DOCUMENTS

| 2,947,125 | 8/1960 | Wilson et al. | 414/795.3 |
| 3,122,242 | 2/1964 | Lopez et al. | 414/900 |
| 3,866,763 | 2/1975 | Alduk | 414/900 |
| 4,354,786 | 10/1982 | Spitler | 414/795.3 |
| 4,684,308 | 8/1987 | Dorner | 414/795.3 |
| 4,778,323 | 10/1988 | Salts | 414/795.3 |
| 5,292,224 | 3/1994 | Torii et al. | 414/900 |

FOREIGN PATENT DOCUMENTS 1037478 7/1966 United Kingdom .

Primary Examiner—Michael S. Huppert
Assistant Examiner—Gregory A. Morse
Attorney, Agent, or Firm—Darby & Darby

[57] ABSTRACT

This is a box stacker which is related with a box shaping machine. The boxes come out at the bottom of the machine and drop by gravity onto a conveyor belt and are conveyed to one end of this belt where the stacker which is object of this invention is located. It has upright adjustable guides, two in front and two at the rear which correspond to the vertical corners of the box, and are at the same time coupled in pairs to two cross shanks respectively, which are in turn coupled at the end to the cross shafts which are joined by longitudinal screws. The screws turn in either direction and the upright guides will be adjusted to fit to the dimensions of the boxes. When one of these lies between the four upright guides, a pusher goes up and moves the box to allow room for another one and so on successively. When a stacked row has been formed, which is automatically counted, it will be moved by a pusher towards a platform which is formed by two plates at right angle.

2 Claims, 3 Drawing Sheets

BOX STACKER

This is a continuation of application Ser. No. 07/982,692, filed Nov. 25, 1992, now abandoned.

PURPOSE OF THE INVENTION

The present invention relates generally to a box stacker. The boxes drop by gravity from the shaping machine along a slide to a conveyor belt which carries them to one end of it, where the box stacker is located. This embodies a simple and fast mechanism which regulates the format of the box, and also automatically counts the number of boxes which fit on each row, so that a number of rows can be formed, all containing the same number of boxes, which is possible because once each row is formed, an upright pusher moves them from the zone of the upright push where each of these rows are formed. These are arranged in an orderly manner on upper plates or strips.

ANTECEDENTS OF THE INVENTION

Conventional box stackers are known today which offer some problems and important drawbacks.

Coming off the box shaping machine, the boxes emerge at the bottom of the shaping station and fall onto a continuous belt which forms an integral part of the stacker and they are conveyed to a sector where an upright stacker piles them up until a row of stacks is formed.

The main disadvantage of these stackers is the costly control of the format or size of the boxes which are to be stacked. On the other hand, only one row can be formed and the operator must be on the spot to remove it at the precise moment.

DESCRIPTION OF THE INVENTION

To find a complete solution to the problems which are mentioned in the above paragraph, a box stacker has been designed which is connected with a box shaping machine and at the bottom of this machine the boxes fall by gravity, moving along a slide, on a conveyor belt which embodies side positioning plates. The boxes are then taken to one end of the belt where the actual; stacker is located. It has adjustable upright guides, two in front and two at the rear, which correspond to the corners of the boxes, and at the same time they are secured to runners which are coupled to two cross shanks which are joined to some small end supports and secured to cross brackets, one in front and one at the back, which are connected to two longitudinal shanks. With this arrangement, when the shanks suitably turn, there will be a closure or separation between the upright corners, adjusted to the dimensions of the base of the box. When this lies between the four upright guides, a pusher emerges from the top of the lower part, and this moves the respective box to a pre-fixed height, where it will later be kept in a stable position. The pusher will later drop to its resting position, at which moment another box can be fitted between the upright guides, and this will again be carried up, in the same way as the previous one and will be moved to an upper position pushed by the second box. When a group of stacked boxes is formed, which are automatically counted at the end of each run; this group of boxes will be moved in a direction that is perpendicular to the conveyor belt by a horizontal pusher moved by a preferably pneumatic cylinder, and suitably led by a guide of the front cross bridge, where the pneumatic cylinder is fitted.

The movement of each group of boxes, once formed, will be performed automatically to enable another group to be formed. One of the front upright guides and another rear guide on the same side incorporate upper plates or strips which converge at right angles, which permit the seating of various groups of stacks.

To provide an easier understanding of this descriptive report and forming an integral part of same, a number of figures are included which show in an illustrative but not a restrictive way the object of this invention.

BRIEF DESCRIPTION OF THE DRAWINGS

FIGS. 4a and 4b.—This is a partial sectional view of lower prolongations that are driven along side guides.

DESCRIPTION OF THE PREFERRED FORM OF EXECUTION

Figure 1:
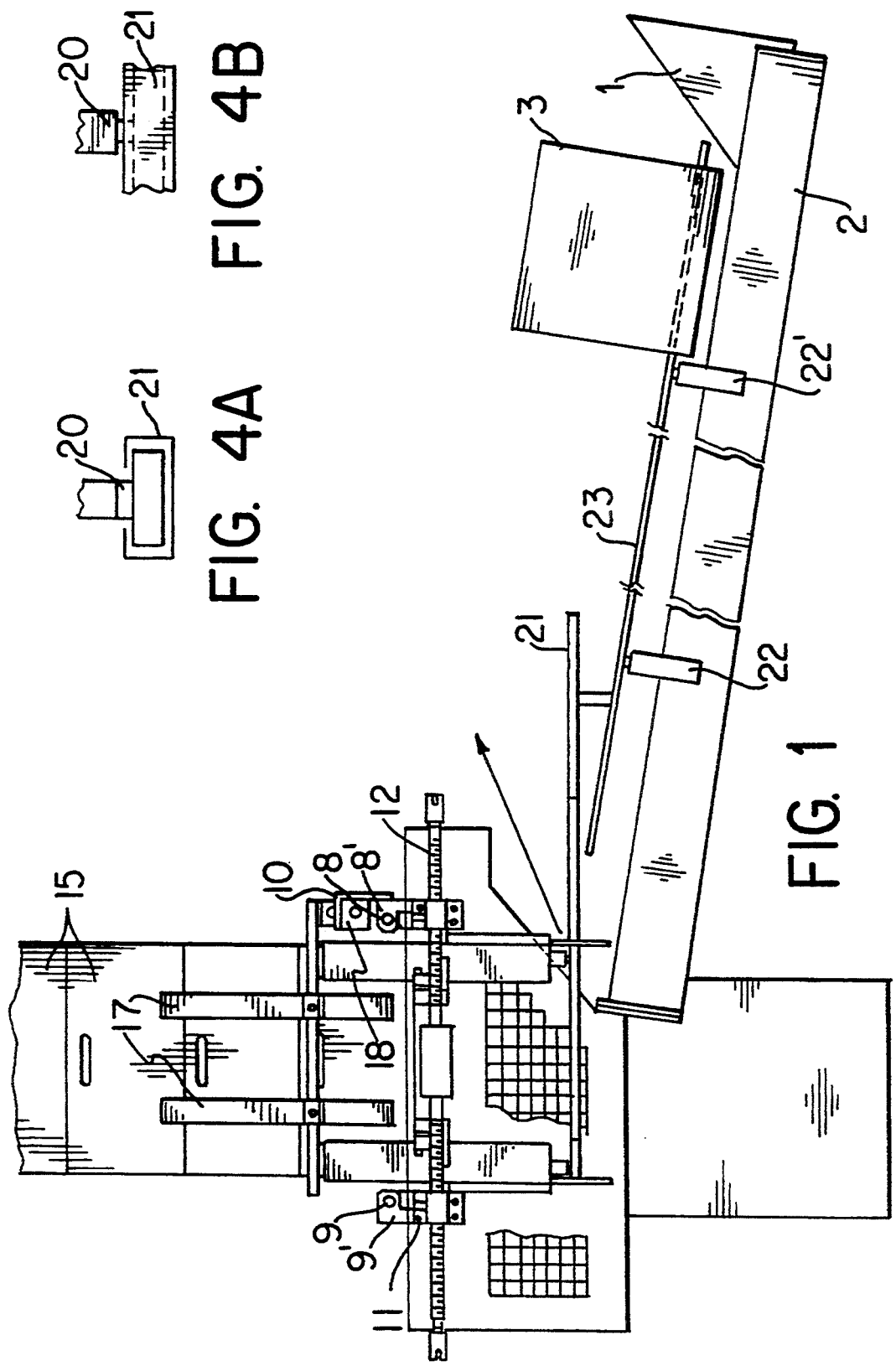
FIG. 1.—This shows an elevated projection of the box stacker which is object of this invention, and it includes a conveyor belt which leads each of the boxes up to the actual stack itself.
Figure 2:
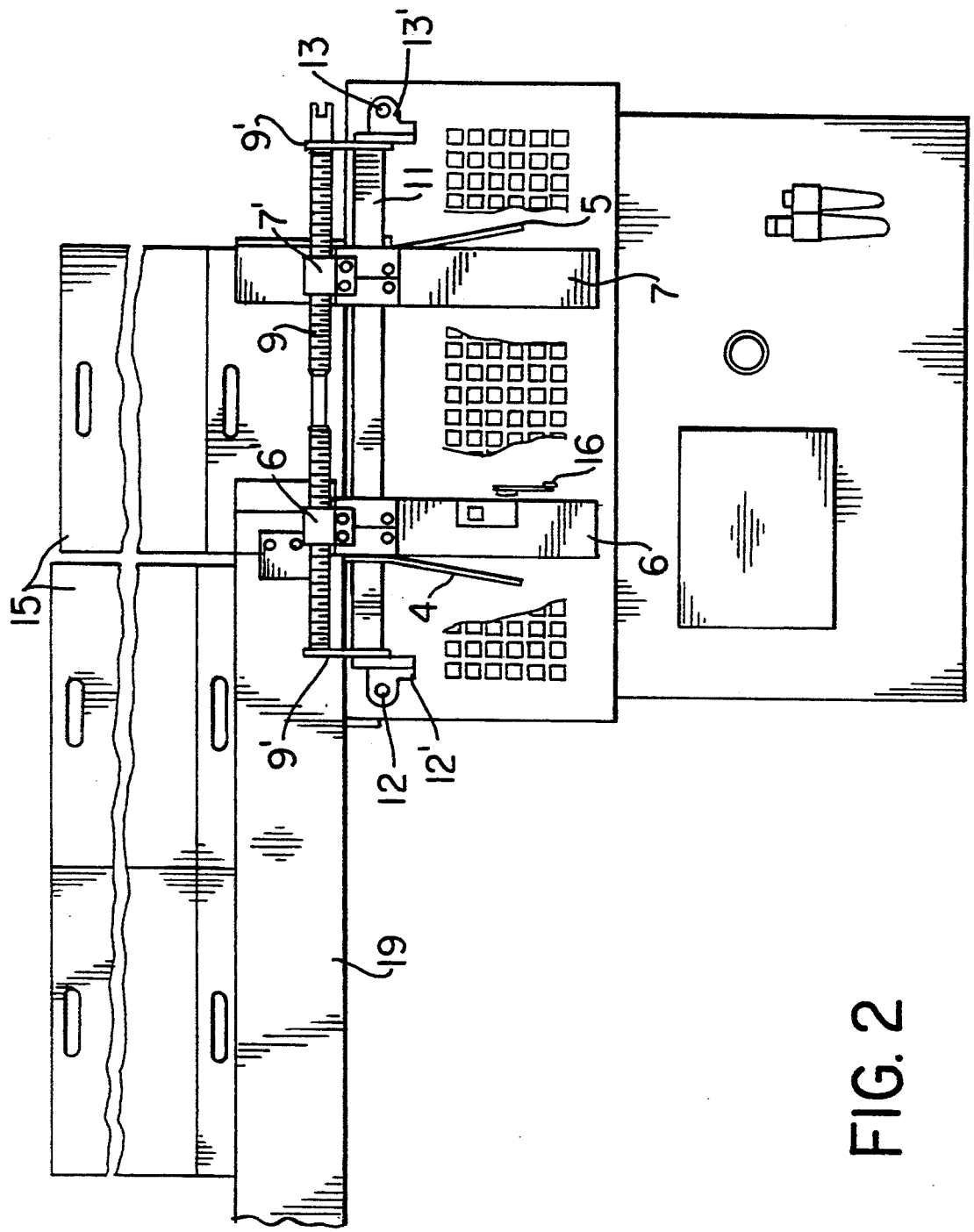
FIG. 2.—This is a profile view of the box stacker, where several rows of automatically stacked boxes are shown.
Figure 3:
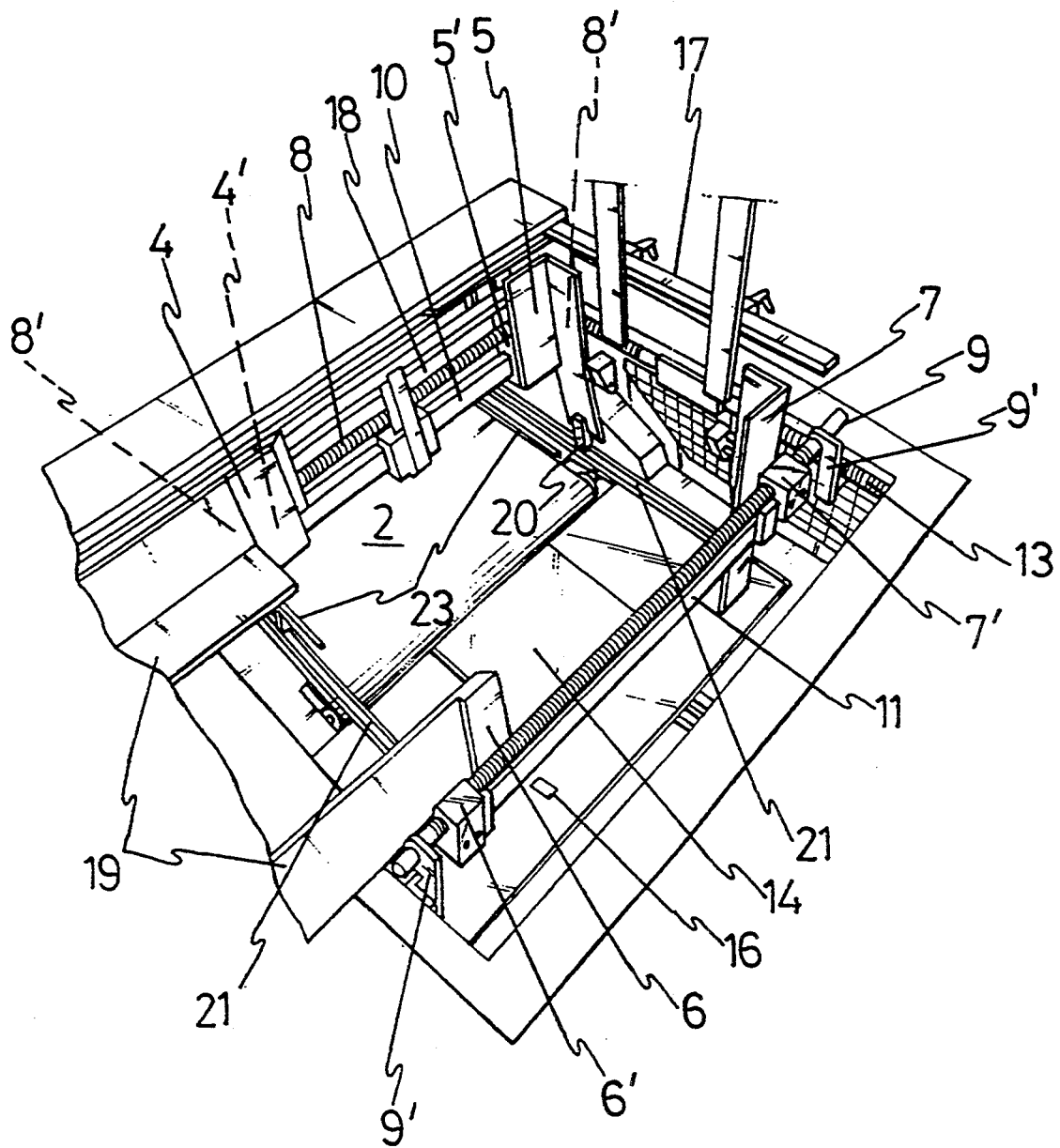
FIG. 3.—This is a perspective view of the main zone of the stacker of the invention, which is where each row of boxes are formed.

Referring to the numbering adopted in the figures, the stacker of boxes of the invention is associated with a box shaping machine. At the bottom of this machine, the boxes emerge and fall by gravity, and advantageously slip down a slide (1), on a conveyor belt (2) which embodies the novelty of having side positioning plates (3). Each box is then carried to the end of the conveyor belt where the stacker of the actual invention is found.

The stacker has easily adjustable upright corners or guides, two in front (4 and 5) and two at the rear (6 and 7), which correspond to the upright corners of the boxes, and at the same time they are fixed to some runners (4', 5', 6' and 7') which are screwed parallel to two cross screws (8 and 9), which are coupled to some small front end supports (8') and rear end supports (9'), which are solidary to cross bridges (10 and 11) respectively, which are in turn connected to two longitudinal screws (12 and 13) by means of small end supports (12' and 13'). With this layout, when the respective screws turn one way or the other, the vertical guides are brought close or separated, and are adjusted to suit the dimensions of the box. When each of these lies between the four upright guides, a pusher (14) emerges from the top of the lower part, which moves the corresponding box at the bottom, to a pre-fixed height where it will later be kept in this stable position. This pusher (14) will then come down to its resting place, when another box can then be fitted between the four upright guides, which will also be lifted up in the same way as the previous one and it will be moved to an upper position pushed by the second box, which will occupy the place of the first box. Once a box has been lifted up by pusher 14, a conventional holding system, such as retractable pins or plates located at the four corners (not shown), holds the box at this elevated position as the pusher 14 retracts to its initial position. When the box is being raised, the box pushes the pins or plates backward until the box has passed by the pins and is in its lifted position. Following this continuous process, a group or row of stacks will be formed (15) which will automatically be counted by a microswitched (16). Once the pre-programmed amount of boxes has been stacked, a conventional counting circuit actuates cylinder 18. This group of boxes (15) will be moved in a direction that is perpendicular to the conveyor belt (2) by means of a horizontal pusher (17) which is moved by a cylinder (18), which preferably will be a pneumatic one and suitably driven by a guide at the front cross bridge (10), where the pneumatic cylinder is also fitted.

The movement of each row of boxes (15) once formed, is made automatically so as to form another one. To do so, one of the front guides (4) and another rear one (6) on the same side, each have upper plates or strips (19) which face one another and permit the seating of various groups of aligned stacks (15). The upright guides (4 and 5) which are connected to the front bridge (10) moreover embody lower prolongations (20) (details shown in FIG. 4a and 4b) which fit on and are driven along rails or side guides (21). Thus, the prolongations 20 move with the upright front guides 4,5 to precisely position the box in the vertical pushing area. The side guides 21 are connected at one end to small supports (22) of the conveyor belt (2), whereas at the other ends, they are linked to the rear vertical guides (6 and 7). In this way, each box that comes off the conveyor belt (2) is perfectly driven as soon as it enters the stacking zone.

Along the conveyor belt (2) and on either side of it, two rods have been designed (23) so that the boxes are perfectly aligned on their run along it (2) and these rods are connected to small supports (22) and to other (22') similar ones, all established on either side of the conveyor belt.

What is claimed:
1. A box stacker comprising:
   a housing;
   a conveyor belt for connection to a box shaping machine, the conveyor belt having an advancement direction from a first end to a box stacking area;
   a pair of guide rods parallel to said advancement direction, said guide rods being disposed on opposite sides of said conveyor belt;
   a pair of parallel longitudinal screws each having first and second supports mounted on said housing;
   a pair of parallel cross screws each being mounted to both of the longitudinal screws by two cross bridges per cross screw;
   a plurality of upright guide, each guide defining each of four corners of a box stacking area, the upright guides being mounted to said cross screws, four sides of the box stacking area being disposed between said plurality of upright guides.
   a horizonal pusher disposed in a pusher guide for removing stacks of boxes from said box stacking area, the pusher guide comprising a fluid cylinder which drives said pusher, wherein the pusher guide is mounted on a selected one of said sides of said box stacking area;
   a pair of seat and fixture plates mounted to the upright guides on the side of said box stacking area disposed oppositely from the side of which said horizontal pusher is mounted, the seat and fixture plates being disposed for receiving and holding stacks removed from said box stacking area by the horizontal pusher;
   a pair of lower prolongations, each lower prolongation being mounted to one of said upright guides;
   a pair of guide rails, each lower prolongation being driven along one of said guide rails;
   wherein each of said guide rails is parallel to and mounted to a respective one of said guide rods; and
   wherein rotation of the longitudinal screws and the cross screws will vary the dimensions of said box stacking area by simultaneously moving said upright guides toward and away from each other such that a vertical symmetrical axis of the box stacking area remains substantially stationary with respect to said housing.
2. A box stacker as in claim 1 wherein the first end of the conveyor belt has a slide and two stabilizer plates for adjusting the position of boxes falling onto the conveyor belt.

* * * * *